3,454,571
PROCESS FOR PRODUCING HIGH GRADE
MELAMINE
Ryo Kokubo, Yasuo Takakuwa, Isao Maruyama, and
Akihiro Shiroishi, Toyama Prefecture, and Mizuhiko Nagakura, Chiba Prefecture, Japan, assignors
to Nissan Kagaku Kogyo Kabushiki Kaisha, Tokyo,
Japan, a corporation of Japan
Filed Aug. 14, 1967, Ser. No. 660,497
Claims priority, application Japan, Aug. 16, 1966,
41/53,535
Int. Cl. C07d 55/28
U.S. Cl. 260—249.7    3 Claims

ABSTRACT OF THE DISCLOSURE

Process for producing high grade melamine from urea by keeping the separator temperature at 200° C. to 350° C. while solidifying the melamine from its gaseous phase under approximately atmospheric pressure thereby obtaining large and uniform crystals of melamine with the impurities adhering to the surfaces of the melamine crystals, and washing said impurities away with an aqueous alkaline solution.

DESCRIPTION

Figure 1:
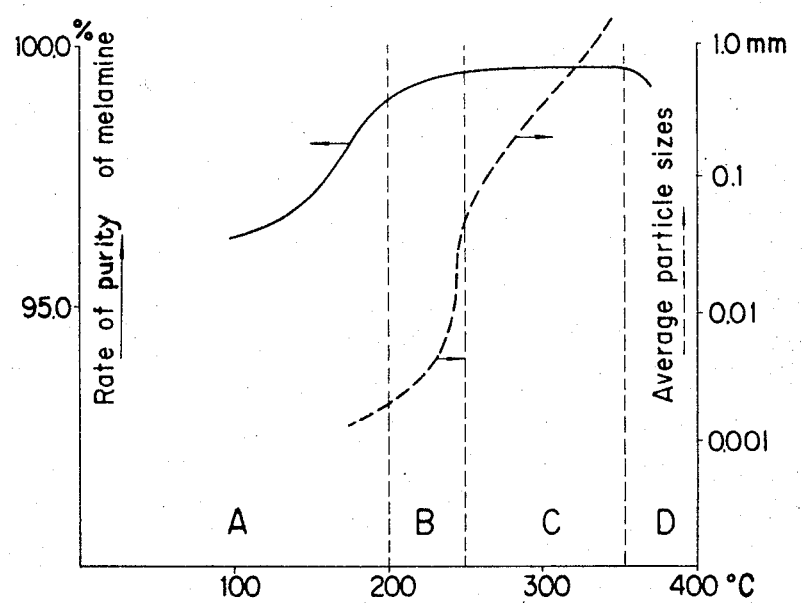

The present invention relates to a process for producing high grade melamine with good resin forming characteristics, said process being characterized by the steps of keeping the separator temperature at 200° C. to 350° C., and preferably at 250° C. to 350° C. in solidifying the high-temperature high-pressure gaseous phase melamine under approximately atmospheric pressure, thereby producing large and uniform crystal particles of melamine, and at the same time causing the impurities to stick to the surfaces of the melamine particles, said impurities being washed away with an aqueous alkaline solution.

At present, melamine is industrially produced by either the high-pressure process or the atmospheric pressure process. For both processes, the raw material can be dicyandiamide or urea, the latter being easier to industrially produce in continuous steps and far more economical.

In the high-pressure process for producing melamine from urea, the reaction products contain small quantities of impurities which are peculiar to the urea process, such as urea, biuret, triuret, cyanuric acid, monoureidomelamine (2-ureido-1,3,5-S-triazine), etc., in addition to the crude melamine impurities common to the dicyandiamide process such as ammeline, ammelide, melam, melem, melom, etc., with a melamine content of 92–96%; and to eliminate these impurities, a refining step is necessitated.

In the past, the gaseous phase process, the recrystallization process, etc., have been proposed for the purpose of refining crude melamine. The present inventors in a series of studies on melamine synthesis by the urea process investigated the impurities peculiar to the urea process, and thereby discovered that these included monoureidomelamine in addition to the already known substances and that this substance would behave similarly to melamine during the refining of the crude melamine. Then we found that when, in the high pressure, liquid phase, melamine synthesis from urea as disclosed in U.S. Patent 3,245,993, the conditions of synthesis were so chosen as to minimize the formation of this substance and the liquid phase product was vaporized into the gaseous phase, from which the melamine was solidified, it was possible to obtain a high-purity melamine. For instance, one example of the composition of the product, in the reactor in the high pressure liquid phase melamine synthesis from urea, which may differ depending on the conditions of synthesis, is as follows: melamine 95.0%, melam 2.0%, urea 1.3%, monoureidomelamine 0.9%, ammeline 0.4%, ammelide 0.2%, melem 0.1%, and others 0.1%. If the reacting liquid having this composition and the gas produced are introduced into, say, an autoclave in which the liquid surface can be continuously controlled, and if the decomposed gas generated in the course of the reaction and/or the added gas (ammonia, nitrogen, carbon dioxide, etc.) are compressed to the pressure necessary to inhibit melamine decomposition, say, 60 kg./cm.$^2$, and heated to 450° C., thereby transforming the melamine to its gaseous phase; and the time of treatment is appropriately chosen to ensure gradual conversion of the accumulated impurities into melamine, thereby continuously vaporizing the liquid phase melamine and driving it in its gaseous phase out of the reaction system, it is possible to obtain a more than 98.0% pure melamine without producing any products of an ammonia-removing condensation such as melam, melem, etc., when the pressure is reduced and the melamine solidified.

However, when melamine is used as a raw material for resin, in view of its excellent workability and commercial value a very high grade melamine with respect to solubility in formalin, stability of solution and its transparence has been demanded. High grade melamine having such properties is not obtainable from the above gaseous phase process. In particular, a formalin solution of melamine produced by the gaseous phase process develops gelation in about 6 days as compared with more than 20 days for a high grade melamine. It is therefore inconvenient for use in making resin products and its commercial value is low.

The present inventors have discovered through more elaborate study into this gaseous phase melamine that this disadvantage is the result of the fact that the melamine is contaminated with small amounts of acidic impurities which are peculiar to the urea process.

Meanwhile, it has been confirmed that a high grade melamine free from these impurities can be obtained by repeating the complicated, uneconomical refining process of recrystallizing the crude melamine obtained through the urea process. To mention a few examples, there are:

(1) The alkali recrystallization process

In this process crude melamine is dissolved in large quantities of water and the solubility of the impurities is increased by adequate alkalization of the mother liquor, so that melamine can be crystallized out of the mother liquor.

(2) Two-stage recrystallization process

In this process a crude melamine solution is rendered acidic to reduce the solubility of the products of ammonia-removing condensation such as melam, melem, etc., and the mother liquor obtained after its filtration is alkalized, thereby crystallizing the melamine. The purpose is attained by repetition of these processes. In any case, the low solubility of melamine in water necessitates the consumption of great quantities of water and accordingly extensive refining equipment, which is very costly. It was therefore proposed to recrystallize the melamine from a high-temperature alkaline water solution under super atmospheric pressure, but if a high-temperature alkaline water solution is used, the hydrolysis of melamine increases and the yield will consequently be lowered and the impurities will increase, thus making it difficult to produce high grade melamine.

Conventionally, it has been considered that, in solidifying and separating melamine under atmospheric pressure, it is preferable to operate at comparatively low temperatures in order to restrain production of the products of ammonia-removing condensation. The reason is that, in solidifying liquid melamine, a surrounding temperature about as high as the melting point of melamine keeps melamine in an unstable liquid state under low pressure, and thereby causes an ammonia-removing condensation reaction etc. and the production of impurities. However, the present inventors have found that the condensation of gaseous phase melamine does not produce any impurities by melamine condensation and decomposition if condensed at about the melting point of melamine (about 354° C.), as the melamine is solidified without passing through said unstable liquid state and further that advantageous effects are obtainable with respect to the particle size and uniformity of the melamine crystals as well as in the location of the impurities. Thus, we have successfully worked out a simple but high-yield economical process of obtaining a high grade melamine with good resin-forming characteristics. By keeping the separator temperature at 200° C. to 350° C., preferably at 250° C. to 350° C. while solidifying the high-temperature high-pressure gaseous phase melamine obtained from urea, under approximately atmospheric pressure, large and uniform crystals of melamine can be obtained and the impurities adhering to the surfaces of these melamine crystals can be washed away with an aqueous alkaline solution.

It is inevitable in extracting melamine as a high-temperature high-pressure gas from the liquid phase melamine obtained from urea that small quantities of impurities peculiar to the urea process infiltrate into the end product, but by keeping the separator temperature at 200° C. to 350° C., preferably at 250° C. to 350° C. while solidifying the high-temperature high-pressure gaseous phase melamine under approximately atmospheric pressure, the melamine crystals can be made large and uniform, and said impurities are produced in an easily soluble form in which they adhere to the surfaces of the large melamine crystals. The present invention has been perfected on the basis of this new discovery. Said easily soluble impurities can be readily dissolved and removed simply by washing the crystals with an aqueous alkaline solution and as a result, a high grade melamine with good resin-forming characteristics can be obtained.

Further details of the process will now be given.

The rate of growth of the melamine crystals, $v$, is expressed in the following formula wherein $\Delta C$ is the supersaturation based on gaseous phase and $K$ is the over-all crystal growth coefficient: $v \propto K \cdot \Delta C$.

Further, $K$ is expressed in the following formula wherein $kd$ is the mass transfer coefficient by diffusion and $kr$ is the rate constant for the surface reaction:

$$1/K = 1kd + 1/kr$$

In the above formula, $kr$ increases as an exponential function with the temperature while $kd$ is scarcely affected by the temperature. In crystallizing melamine directly from the gaseous phase under the condensation conditions of the present invention, it is found that $kr$ is dominant in the rate of crystal growth. Accordingly, condensation at high temperatures results in an increase in the rate of over-all crystal growth.

On the other hand, while it might appear to be advantageous for the temperature to be lowered and $\Delta C$ in the formula increased in a conventional manner, in this case an extraordinarily large nuclear generation is caused, the crystals become finer, and the impurities are condensed simultaneously.

In the condensation of melamine at 200° C. to 350° C. as in the present invention, melamine crystals are easily produced because the condensation temperature of melamine is very different from that of the impurities. In this case, the cooling is so slow that extraordinarily large nuclear generation is prevented, the crystal growth is promoted with a large over-all crystal growth coefficient with small supersaturation in the gaseous phase and the crystals thus obtained are pure, large and uniform, with regular molecular disposition.

However, although crystals which are pure, large and uniform are obtained within the separator, in practice, because the temperature is lower than the preferable temperature range of the present invention when the melamine crystals thus obtained are removed from the system together with small amounts of gas containing the impurities, it is inevitable that some impurities are condensed. Since the impurities are condensed mainly at this stage, they adhere to the surfaces of the large melamine crystals only in small quantities. Moreover, the adherent impurities, which are urea or its decomposition products, chiefly acidic material such as cyanuric acid, ammeline and ammelide, which are readily soluble in alkaline solutions, are very easily removed.

Figure 2:
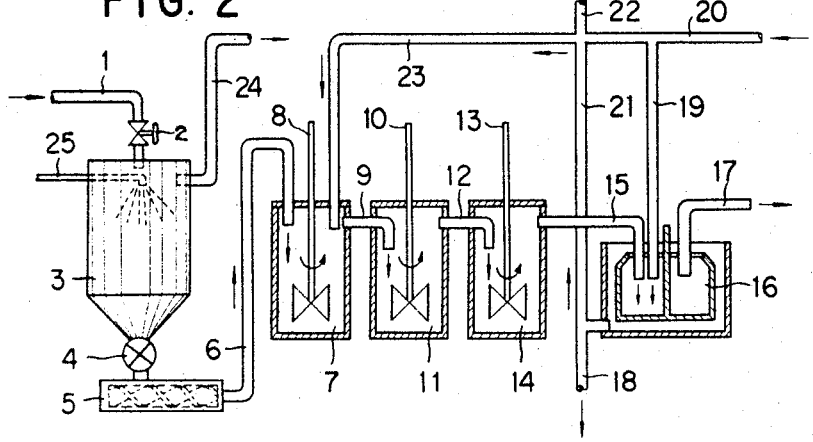

In the following portion of the description reference will be made to the accompanying drawing, in which:

FIGURE 1 shows the relation of the separator temperature to the purity before alkali washing and the average particle sizes of melamine; and FIGURE 2 illustrates one of the steps in the process of this invention.

The melamine purity and particle size before washing with an aqueous alkaline solution depend directly on the separator temperature, said dependence being illustrated in FIG. 1, which shows that in the A-region, i.e., when the separator temperature is lower than 200° C., the impurities are abundant, thus decreasing the melamine purity; and the melamine is obtained as fine crystals, which is undesirable. In the B-region, i.e., the region with a temperature of 200° C. to 250° C., the impurities are fewer and the melamine purity is comparatively high, but the product is so small in particle size that it is a little hard to separate it from the impurities. In the C-region with a temperature of 250° C. to 350° C., the melamine crystals become large and uniform, with a lower content of impurities which can easily adhere in readily soluble condition to the surfaces of large crystals. Therefore, the impurities can be washed away with an aqueous alkaline solution and a melamine with low water content can be obtained by filtering. Thus, the consumption of alkaline solution for washing can be reduced, resulting in a high yield, and the C-region is found especially preferable. In the D-region with a temperature higher than 350° C., the products of ammonia-removing condensation such as melam, melem, melom, etc., are generated in large quantities, making this region undesirable.

The separator temperature may be kept at the desired level by external cooling and/or internal cooling. For the purpose of internal cooling, a cooling inert gas may be blown into the separator or the known method of utilizing the latent heat of a sprayed volatile liquid, for instance, water or liquid ammonia, may adequately serve the purpose.

For alkaline washing, an $N/15$ to $N/100$ aqueous solution of a caustic alkali or a 2% to 15% aqueous solution of ammonium hydroxide, or the like, is mixed at a ratio of 2 to 4 parts of alkali to 1 part of melamine; kept at 60° C. to 90° C. for about 30 minutes; then cooled, filtered and washed with water. When the alkaline concentration is lower than the above, the impurities will not be sufficiently dissolved, but a higher concentration than the above will uneconomically increase the alkali consumption. Heating is necessary only to dissolve the impurities deposited on the surfaces of the melamine crystals; therefore about 30 minutes of heating will be enough. Since the impurities in the alkaline mother liquid will not segregate under this condition even if vigorously cooled, it is advantageous for the purpose of minimizing the dissolution loss of melamine to have as low a cooling temperature as possible, but industrially a cooling temperature lower than 15° C. would be impractical.

As the process of this invention involves alkaline washing, there is no need for perfect dissolution of the melamine and only a little aqueous alkaline solution will be sufficient, so the apparatus is extremely simplified. And as compared with the aforementioned recrystallization process, the proposed process can be carried out on a substantially smaller scale; therefore there is hardly any loss of melamine in the process, with an excellent yield of over 98% as compared with less than 90% for the recrystallization process. Thus the process of this invention is economically highly profitable.

Next, the process according to this invention will be described with reference to FIG. 2.

In the production of gaseous phase melamine from urea, ammonia is used with the urea, the weight ratio of ammonia to urea being 0.2–1.0. The liquid phase melamine is produced from urea under 50 kg./cm.$^2$ to 150 kg./cm.$^2$ (gauge pressure) at about 360° C. to 400° C. The resulting liquid melamine and gas are held, under 40 kg./cm.$^2$ to 100 kg./cm.$^2$ (gauge pressure) at about 420° C. to 480° C., for more than 1 hour under conditions which yield a concentration of gaseous phase melamine which is equal to or larger than the theoretical mol percent of melamine in the total reaction product. Thus, the impurities are converted into melamine while the melamine is being transformed into its gaseous phase and practically all the melamine is therefore withdrawn in its gaseous phase.

Liquid phase melamine is evaporated by the evaporator (not shown). The saturated gaseous phase melamine under the given conditions passes from the tube 1 through the pressure control valve 2 into the separator 3, which is operated under approximately atmospheric pressure with the water spray nozzle 25 spraying in water; and the latent heat of the water's evaporation cools and keeps the temperature at 200° C. to 350° C. The melamine therein solidified is separated from the waste gas, which is discharged through the tube 24. Melamine with over 98.0% purity is delivered through the rotary valve 4, the screw feeder 5 and the tube 6 into the mixing tank 7. On the other hand, 2 to 4 parts of a 2% to 15% aqueous ammonium hydroxide solution or an $N/15$ to $N/100$ caustic alkaline solution per 1 part of melamine are introduced through the tube 23 into the mixing tank 7. The slurry obtained after full agitation by the stirrer 8 overflows through the tube 9 into the heating tank 11 equipped with the stirrer 10. In the heating tank 11, the slurry is heated at 60° C. to 90° C. for about 30 minutes; then the slurry, while dissolving the impurities, overflows through the tube 12 into the cooling tank 14 equipped with the stirred 13; and in this cooling tank it is cooled to 15° C. to 30° C. Then the cooled slurry passes through the tube 15 into the centrifuge 16, where the melamine crystals are separated. The melamine is next washed with cool water in the tube 19, the volume ratio of water to melamine being 1–2.5. Finally, the washed melamine crystals are removed through 17. Over 70% of the filtrate is delivered into the tube 21; the necessary amount of water is added through the tube 20 and/or the necessary amount of 28% aqueous ammonium hydroxide solution is added through the tube 22; and these are circulated through the tube 23 into the mixing tank 7, the remaining filtrate being discharged from the tube 18.

The process of this invention will now be explained in greater detail by describing several examples thereof, but the scope of the present invention should not be considered to be confined to these specific examples alone.

Example 1.—Urea was used as the raw material and a liquid phase reaction was brought about at 400° C., under a pressure of 100 kg./cm.$^2$, followed by liquid phase evaporation at 450° C., under a pressure of 60 kg./cm.$^2$. The melamine thus obtained was injected into the separator, the temperature of which was kept at 300° C. by means of a water spray and the pressure in which was kept at nearly atmospheric value. Finally, the cooled and condensed melamine was continuously withdrawn through the screw feeder from the bottom of the separator. The product obtained was large crystal particles of 0.2–2 mm. diameter with the composition: melamine 99.1%, urea 0.3%, melam 0.13%, mono-ureidomelamine 0.2%, ammeline and ammelide 0.2%, others (ashes, etc.) 0.07%. The melamine thus solidified from the gaseous phase was continuously fed at a rate of 10 kg./hr. together with a 10% aqueous ammonia solution at the rate of 30 l./hr. into a mixing tank having an internal capacity of 20 l. The overflowing slurry was heated at 70° C. for 30 minutes in the heating tank to dissolve the impurities adhering to the surfaces of the melamine crystals, and thereafter was cooled down to 20° C. When the resulting slurry was filtered by a centrifuge and washed with cool water flowing at a rate of about 10 l./hr., its water content became 4–8%. Then it was dried down to a water content of less than 0.01% on a pneumatic dryer and a high grade melamine was ultimately obtained.

70% of the filtrate was recirculated, producing melamine at the rate of 10.6 kg./hr. with an 8.0% water content.

After drying, the product was obtained at a rate of 9.7 kg./hr., the yield of refined melamine amounting to 98%. This yield is remarkably high as compared with 90% or so for the recrystallization process. The purity of the melamine was 99.9% and its formalin resin solution was clear. In about 20 days, devitrification occurred, but no gelation was observed.

Control test 1.—In the above-mentioned Example 1, when the melamine solidified from the gaseous phase—which had not been treated with an aqueous ammonia solution was dissolved in formalin, the solution was slightly tainted with brown and its formalin resin solution gelated in about 6 days.

Control test 2.—In the above-mentioned Example 1, the same treatment was carried out except that the separator temperature was kept at 175° C., and as a result at 98.0% pure melamine was yielded as a fine powder, which was then treated with alkali. The formalin resin solution of this powder exhibited devitrification in 15 days.

Example 2.—With the same treatment as in Example 1, except that the separator temperature is kept at 330° C., a melamine solidified from the gaseous phase melamine, 99.5% pure and consisting of crystals 0.2–5 mm. in diameter, was produced. 500 g. of this melamine was suspended in 2 l. of a 5% aqueous ammonium hydroxide solution. After being stirred for about 30 minutes at 80° C., it was cooled to 15° C., filtered, washed with 1 l. of water and dried, producing 486 g. of melamine. The purity of the melamine was 99.9%, and its formalin resin solution exhibited neither devitrification nor gelation in 20 days.

Example 3.—With the same treatment as in Example 2, except for the use of an $N/50$ caustic soda solution and 2 l. of washing water, a 99.8% pure melamine was produced and its formalin resin solution showed no change in over 20 days.

What is claimed is:

1. The method of treating the gaseous phase products of a reaction in which gaseous melamine is produced from urea in order to obtain a purified solid phase melamine having good resin-forming characteristics, said method comprising the steps of holding said gaseous phase products at a temperature of between 200° C. and 350° C. until said melamine has crystallized out, and then washing said crystals with an alkaline solution.

2. The method claimed in claim 1 according to which said temperature is between 250° C. and 350° C.

3. The method claimed in claim 1 in which said gaseous phase products are held under approximately atmospheric pressure while said crystallization is taking place.

References Cited

UNITED STATES PATENTS

| | | | |
|---|---|---|---|
| 3,328,401 | 6/1967 | Marten | 260—249.7 |
| 3,386,999 | 6/1968 | Manes | 260—249.7 |

JOHN D. RANDOLPH, *Primary Examiner.*

JOHN M. FORD, *Assistant Examiner.*

U.S. Cl. X.R.

260—248, 249.5, 249.8